US007341085B2

(12) United States Patent
Tinivella

(10) Patent No.: US 7,341,085 B2
(45) Date of Patent: Mar. 11, 2008

(54) STATION FOR APPLYING SEGMENTS OF OPENABLE/RECLOSABLE STRIP ON A PLASTIC FILM WEB DESTINED TO FORM BAGS

(75) Inventor: Valter Tinivella, Busto Arsizio (IT)

(73) Assignee: Ilapak Research & Development S.A., Montagnola (CH)

( * ) Notice: Subject to any disclaimer, the term of this patent is extended or adjusted under 35 U.S.C. 154(b) by 318 days.

(21) Appl. No.: 11/088,872

(22) Filed: Mar. 25, 2005

(65) Prior Publication Data

US 2005/0211388 A1 Sep. 29, 2005

(30) Foreign Application Priority Data

Mar. 29, 2004 (IT) .......................... MI2004A0604

(51) Int. Cl.
*B32B 37/00* (2006.01)

(52) U.S. Cl. ...................... 156/513; 156/514; 156/519; 156/252; 156/253; 156/265; 156/270; 53/133.8; 53/139.2; 383/63; 383/66; 493/201; 493/213; 493/927

(58) Field of Classification Search ................ 156/513, 156/514, 519, 252, 253, 265, 270; 53/133.8, 53/139.2; 383/63, 66; 493/201, 213, 927
See application file for complete search history.

(56) References Cited

U.S. PATENT DOCUMENTS 2,467,572 A * 4/1949 Weisselberg ................. 156/61
3,287,878 A 11/1966 Mobley ....................... 53/133
3,790,424 A 2/1974 Young, Jr. et al. .......... 156/379
3,884,738 A * 5/1975 Hofius, Sr. ................. 156/73.1

FOREIGN PATENT DOCUMENTS

| | | |
|---|---|---|
| EP | 0371314 | 6/1990 |
| EP | 1170217 | 1/2002 |
| GB | 1440911 | 6/1976 |

OTHER PUBLICATIONS

Patent Abstracts of Japan, vol. 2003, No. 3, May 5, 2003 & JP 2002 337254 A (Tetra Laval Holdings & Finance SA).

* cited by examiner

*Primary Examiner*—Philip Tucker
*Assistant Examiner*—Kimberly K McClelland
(74) *Attorney, Agent, or Firm*—Jacobson Holman PLLC

(57) ABSTRACT

A station for the application of segments of openable/reclosable strip on a plastic film web destined to form bags, includes a device for sealing segments of strip at intervals on the film and a device for punching predefined zones of film. The punching device and the sealing device are positioned in the station along the film path to act in sequence in the same zone for punching the film and sealing the segments in the predefined points of the film keeping the film stationary between the film punching operation and the corresponding operation for sealing a segment on the film.

10 Claims, 5 Drawing Sheets

STATION FOR APPLYING SEGMENTS OF OPENABLE/RECLOSABLE STRIP ON A PLASTIC FILM WEB DESTINED TO FORM BAGS

BACKGROUND OF THE INVENTION

1. Field of the Invention

The present invention herein relates to a station for sealing strip elements with opening/reclosing function on plastic film that is destined to form bags.

2. State of the Prior Art

In the known technique types of bags in plastic film are known which are fitted with a strip element sealed to one side of the bag (generally the internal side) and which provide the bag with the characteristic that they can be easily opened and reclosed. For example, strip elements are known that have a ripping thread, which when pulled rips the bag along the opening line and an adhesive band that duly uncovered permits the bag to be reclosed.

These strip elements require the punching for entering the element and leading up to the strip to be provided with suitable positions on the side of the bag. For this reason in the known technique, along the path of the film towards the machine producing the bags first a punching station is provided that carries out the suitable punching on the film, and then a sealing station that seals the strip element in correspondence with the punching carried out.

The positioning of the strip in relation to the punching must be very precise, as even just slight staggering, sometimes even less than a millimeter, can impede the opening and/or reclosing of the bag that will be formed or cause it to be defective.

In the machines of the known technique therefore attempt has been made to make the movement of the film from the punching station for the sealing station as precise as possible. This however is complicated both by the speed that is required and by the elasticity of the film used. The machines of the known technique are therefore not fully satisfying.

The general objective of the present invention is to avoid the inconveniences mentioned above by providing a station that permits the cutting of the film and the sealing of the strip element with satisfying precision in the corresponding positions, even at the highest operating speeds and independently from the elasticity of the film.

SUMMARY OF THE INVENTION

In view of this objective decision was made to produce, in accordance with the invention, station for applying segments of openable/reclosable strip on plastic film web destined to form bags, comprising means for sealing said strip segments at intervals on the film and means for punching predefined zones of film for the access to zones of said segments through the film, characterized in that the punching means and the sealing means are positioned in the station along the film path to act in sequence in the same zone for punching the film and sealing the segments in the predefined points of the film keeping the film stationary between the film punching operation and the corresponding operation for sealing a segment on the film.

BRIEF DESCRIPTION OF THE DRAWINGS

To clarify the explanation of the innovative principles of the present invention and its advantages in comparison to the known technique, herein follows a description, with the aid of the enclosed drawings, of an embodiment thereof, applying these principles. In the drawings.

Figure 6:
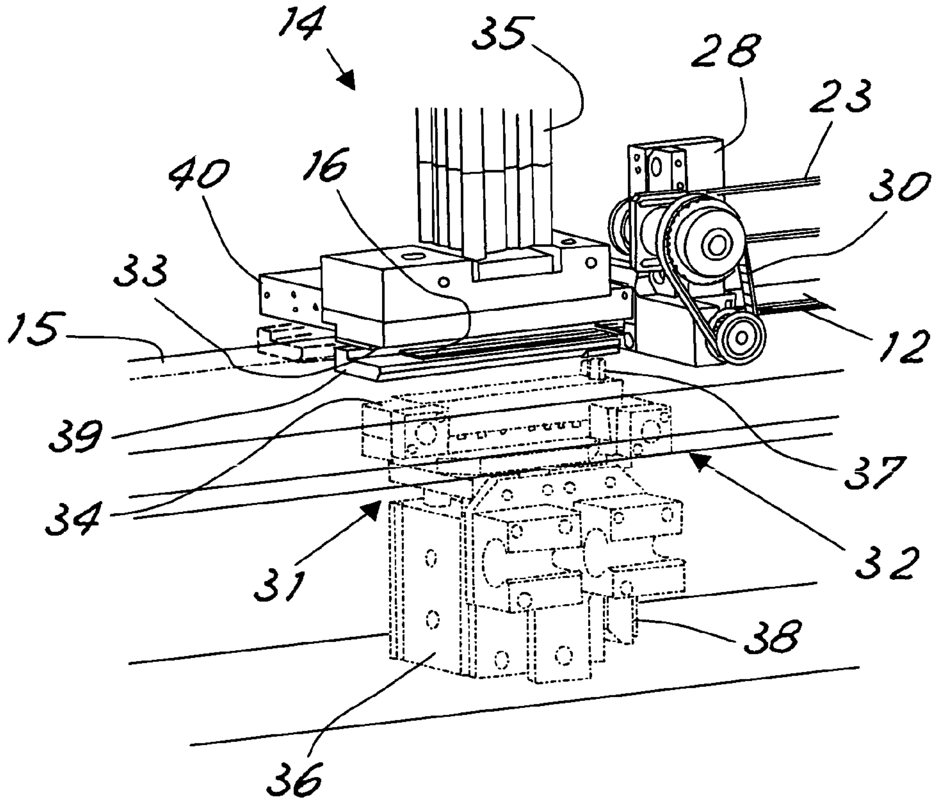
FIG. 6 represents a schematic view in prospective of a punching and cutting zone of the station.

FIGS. from 7 to 10 are schematic views in side section of operative sequences of the punching and cutting zone shown in FIG. 6.

DETAILED DESCRIPTION OF THE INVENTION

Figure 1:
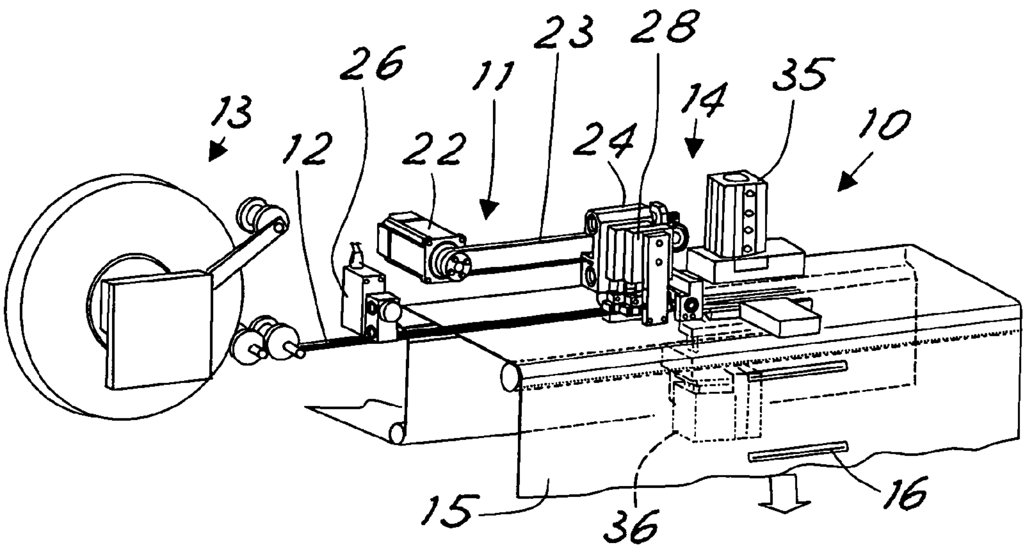
FIG. 1 represents a partial schematic view in prospective of a station in accordance with the invention.

In reference to the Figures, FIG. 1 shows a station, indicated generically with 10, made in accordance with the invention for the application of opening and reclosing elements 16 to a suitable plastic film 15. The station 10 comprises means 11 for feeding a suitable strip or ribbon 12, being unwound from a reel 13 (for example with a dandy roll that activates a tensioning brake), towards a cutting and punching zone 14, where the strip 12 is separated into segments 16 that are sealed onto the strip of film 15 that crosses the station.

Figure 2:
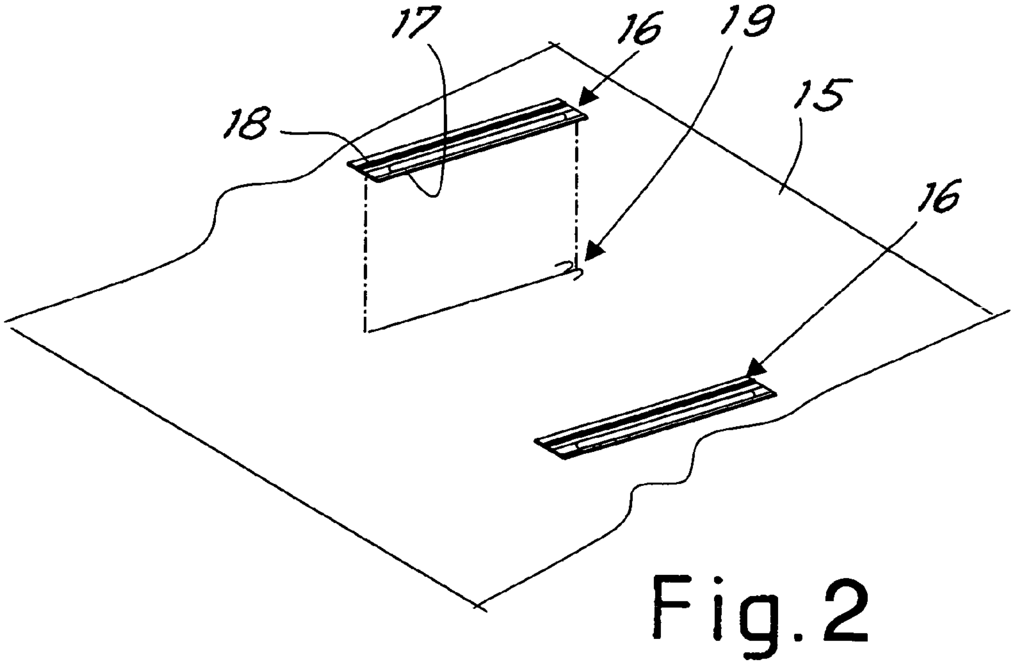
FIG. 2 represents a partially exploded schematic view of a film assembled with strip elements by means of the station in accordance with the invention.

Various types of segments 16 can be used by the station. FIG. 2 shows a type that can be used with particular advantage by the station. Each element 16 comprises an adhesive band 17 and a ripping thread 18 and is applied with one end positioned with precision in relation to "half moon" punching 19 on the film. The application side of the elements 16 is that destined to become the inside of the bags that will be formed with the film.

Figure 3:
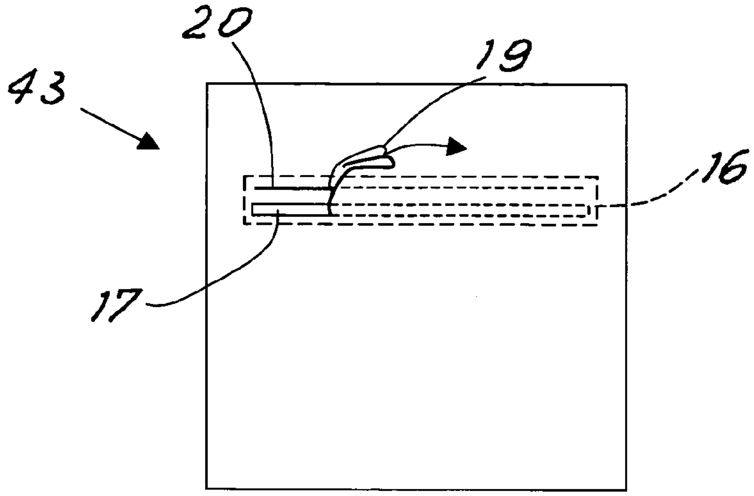
FIG. 3 represents a partial schematic view of a bag that can be obtained with the film of FIG. 2.

FIG. 3 shows an example of bag 43 formed by the film and with such an element 16 inside. By pulling the flaps 19 that result from the punching of the bag the thread 18 is pulled thus ripping the bag in 20, opening it, and the adhesive part 17 is uncovered which enables temporary reclosing of the bag simply by folding down the upper edge against the adhesive strip.

The general lines of similar types of opening/reclosing are well known and therefore will not be further described or shown herein, an expert technician being capable of understanding the principles of the present invention on the basis of the description herein given.

Figure 4:
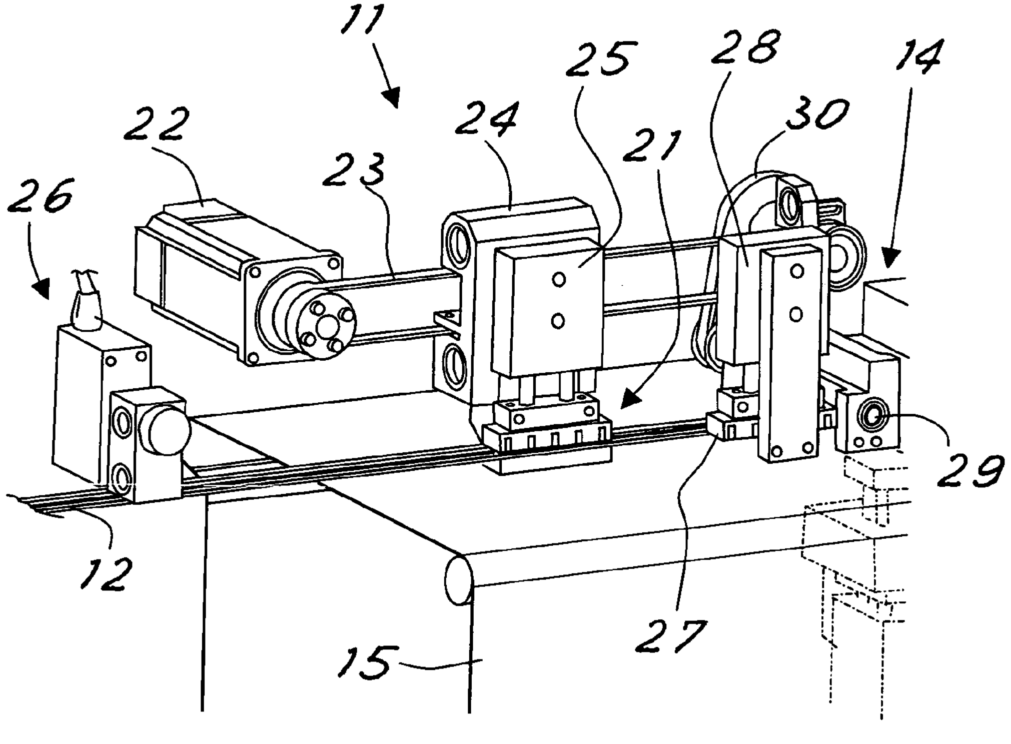
FIG. 4 represents a schematic view in prospective of a zone of the station with means for feeding strip elements from sealing to the film.
Figure 5:
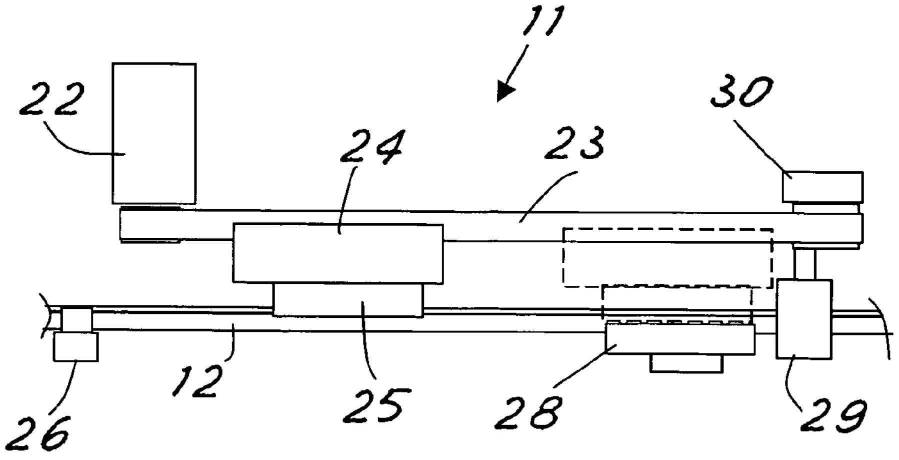
FIG. 5 represents a plan view of the zone of FIG. 4.

FIG. 4 shows in greater detail the means for feeding the strip 12. They comprise pincers 24 that are motorized, by means of a motor 22 and a toothed belt 23, to translate backwards and forwards in the feeding direction of the strip 12 towards the sealing means 14. The pincers 24 can be supported by means of suitable guides, for simplicity not shown completely. The pincers have jaws 21 moved by an actuator 25 to control the closing of the pincers for gripping the strip when the pincers are in the position away from the sealing means (position to the left in FIG. 4 and shown with full line in FIG. 5). The forward movement of the pincers towards the sealing means thus pushes the strip between the sealing means. When the pincers 21 reach the position at the end of the stroke forwards (shown with a dotted line in FIG. 5) they release the strip 12 and carry out a free return movement towards the initial position, for a new feeding cycle. The entity of the stroke of the pincers will depend on the length of the segment 16 that is required to be sealed to the film. Advantageously, this length will be defined with the aid of markers (not shown) traced on the strip 12 and whose passage is detected by a suitable sensor 26 that thus synchronizes the functioning of the station.

As can be seen clearly also in FIG. 4, near the sealing means a second pair of pincers 27 is advantageously present that is controlled by an actuator 28 to grip and block the strip during the operations for cutting the head segment to form an element 16. A unidirectional conveyor roll 29 can also be advantageously present, motorized by the same motor 22 through a second belt 30. This helps the introduction of the head of the strip through the sealing means.

FIG. 6 shows the operative zone for sealing and punching 14 as seen from the opposite side in comparison to FIG. 1.

According to the principles of the present invention, the station 10 for applying segments of openable/reclosable strip on plastic film, comprises means 31 for sealing segments of strip at intervals on the film and means 32 for punching predefined zones of film that are positioned in the station along the film path to act in sequence in the same zone for punching the film and sealing the segments in the predefined points of the film keeping the film stationary between the film punching operation and the corresponding operation for sealing a segment on the film. In this manner any problem of misalignment between sealing and punching because of translation movements of the film is prevented.

Figure 7:
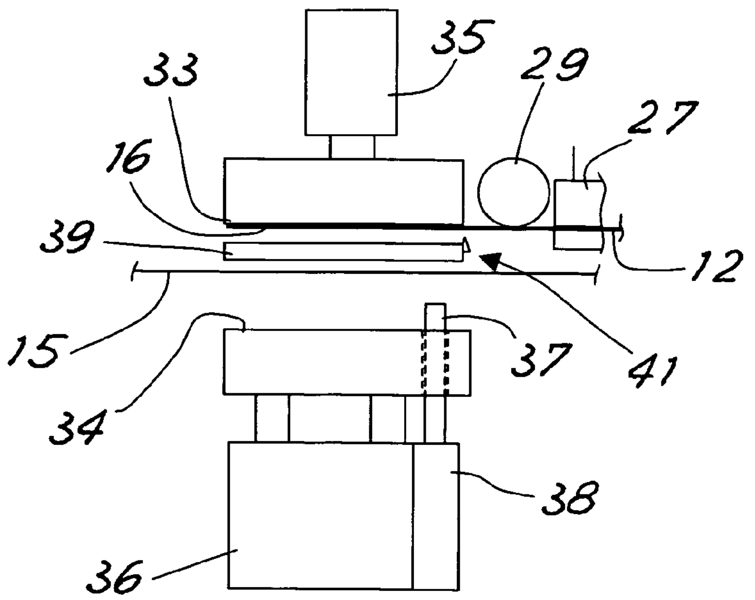

As can be seen clearly in the schematic FIG. 7, the sealing means comprise two facing surfaces for sealing 33, 34 that are reciprocally mobile towards each other with interposition of the film and of the segment to be sealed to the film. The movement is obtained by means of an upper actuator 35 and a lower actuator 36.

The punching means 32 comprise at least a punch 37, that is mobile towards the surface of the film by means of an actuator 38 and, on the opposite face of the film, opposite contrast means 39. The contrast means, in the form of a plate, also provide support and guide for the head of the strip that forms the element 16 to be sealed.

To permit the sealing also around the punched zone, the punches are commanded to project towards the film through one of the surfaces to be sealed.

The contrast means 39 are mobile, by means of an actuator 40) between an operative position (shown with line in FIG. 6) and a non-operative position (shown with dotted line in FIG. 6). The direction of movement is advantageously transversal to the direction of the sealing surfaces being brought closer.

In the operative position the contrast means are interposed between one of the surfaces to be sealed (the upper, in the embodiment shown) and the corresponding face of the film, so as to constitute a striker plate to the punch 37. In the non-operative position the contrast means are instead outside the interposition, so as to permit the surfaces to be sealed 33, 34 to be brought close until the segment 16 is sealed on the film between them.

To keep the segment 16 in position when the contrast means move to the non-operative position, the upper surface 34 is advantageously made with known suction means to keep the segment adherent to it by means of a “suction” effect.

FIG. 7 shows a first phase of the operative cycle of the station, in which the strip 12 has already been fed between the surface to be sealed 33 and the contrast 39. In this phase the contrast prevents the strip from “falling” on the film 16.

Figure 8:
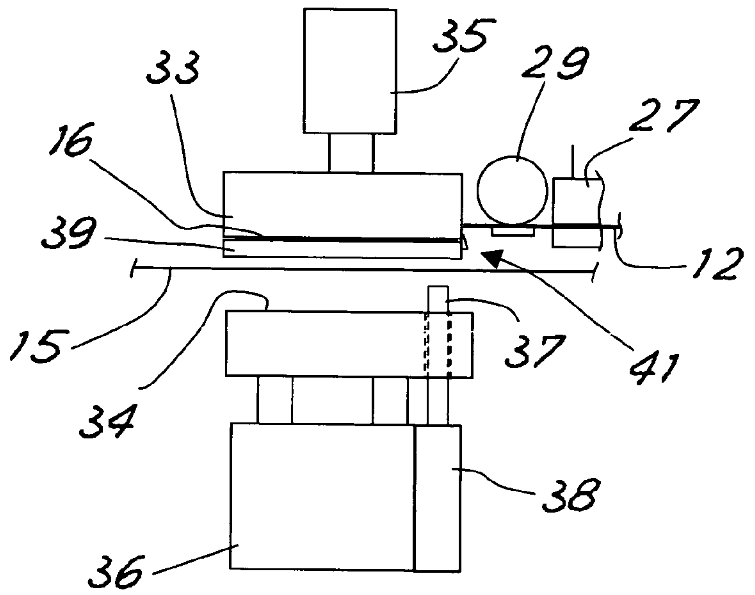

In this phase the strip 12 is held by the pincers 27 in a closed position. As can be seen in FIG. 8, the upper part 33 is then moved downwards for a first stroke, causing the segment 16 to be cut (by means of means of cut 41 advantageously made like cutting blades in one with the contrast and with the part 33, so that it is the same lowering movement of the surface 33 that activates them). The segment 16, cut to the required length set by the previous advancement of the strip, is held thanks to the vacuum of the suction of the surface 33 and is leveled by the contrast plate 39. Thus the first phase finishes and the applicator can remain and wait an indefinite time, so that the devices downstream from the station (typically a known packing machine, not shown) finish drawing the film 15.

Figure 9:
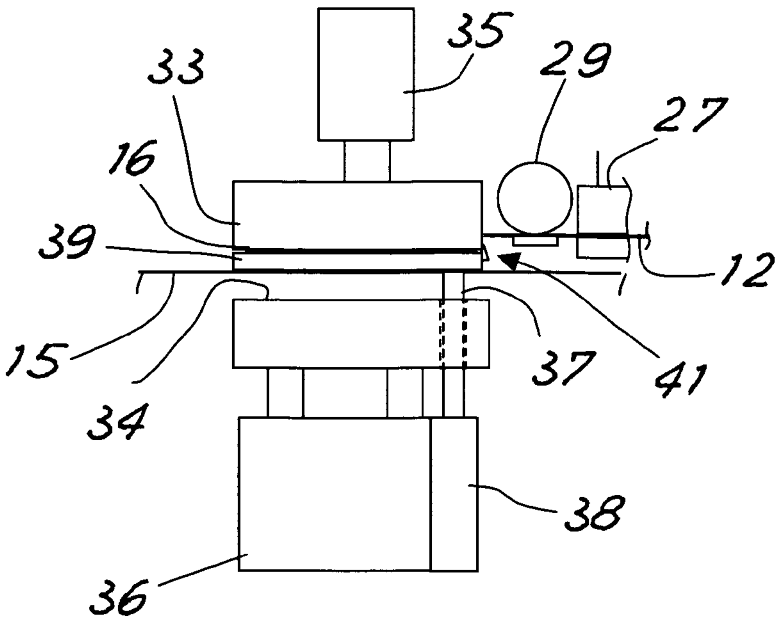

When the drawing has finished the second operative phase can start. In this phase, shown in FIG. 9, the punch 37 is actuated for punching the film, using the contrast 39 as counter-punch.

Figure 10:
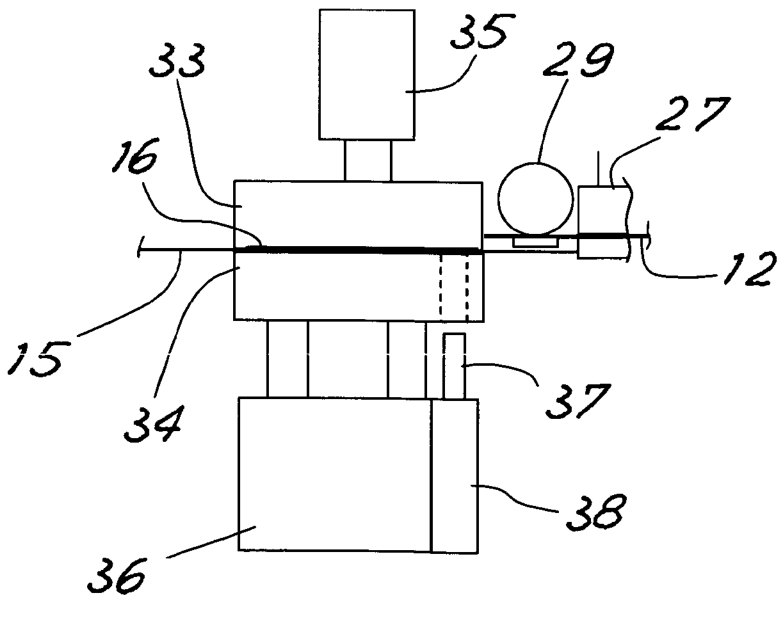

After this, the contrast 39 moves to the non-operative position and (as can be seen in FIG. 10) the surfaces to be sealed are commanded to move closer by means of a further lowering of the surface 33 and a raising of the surface 34, so that the film 15 is compressed against the tape represented by the element 16, thus causing the heat-sealing of the element to the film. The surface 34 is the heated sealing surface.

At this point the cycle has finished, and the station can return to the initial position, ready for further feeding of strip and film and the production of the next sealing at suitable distance.

At this point it is clear how the preset objectives are achieved. As the punching of the film and the following heat-sealing are carried out by the same station and, thus, the two operations have the same positioning in relation to the film, a decidedly more effective and precise application is made compared to the previous applicators that carried out these phases on two different stations, interpositioning a phase of drawing film with an intrinsic error of positioning. In addition, the station in accordance with the invention is more compact and much less cumbersome compared to the devices of known technique. This facilitates the production of the production line of the bags.

Naturally, the description made above of an embodiment applying the innovative principles of the present invention is given as example of such innovative principles and must not therefore be taken as limitation of the scope of the design right herein claimed. For example, the punch can have any form is required for the punching operations suitable for the specific element 16 that is used.

What is claimed is:

1. Station for applying segments of openable/reclosable strip on plastic film web destined to form bags, said station comprising sealing means for sealing of said strip segments at intervals on the film and punching means of predefined zones of film for access to zones of said segments through the film, the punching means and the sealing means being positioned in the station along the film path to act in sequence in the same zone for punching the film and sealing the segments in the predefined points of the film keeping the film stationary between the film punching operation and the corresponding operation of sealing a segment on the film, the sealing means including two facing sealing surfaces reciprocally mobile towards each other with interposition of film and of the segment to be sealed to the film and the punching means includes on one face of the film at least one mobile punch movable towards the surface of the film and on the opposite face of the film opposite contrast means, the contrast means being mobile between an operative position in which the contrast means is placed between one of the sealing surfaces and the corresponding face of the film to constitute a striker plate to the punch and a non-operative position outside the interposition to permit the sealing surfaces to be brought close and to permit the sealing of the segment on the film between them.

2. Station according to claim 1, wherein in the operative position the contrast means is positioned between the film and segment to be sealed.

3. Station according to claim 2, wherein the sealing surface facing the segment to be sealed comprises suction means for keeping upon command the segment against it and away from the contrast means in an operative position.

4. Station according to claim 1, wherein the contrast means includes a plate that is parallel to the sealing surfaces and that is motorized to move between the operative position and the non-operative position with movement transversal to the direction of reciprocal nearing of the sealing surfaces.

5. Station according to claim 1, wherein the at least one mobile punch is commanded to project towards the film through one of the sealing surfaces.

6. Station according to claim 1, further comprising means for feeding the segments as a continual strip, the feeding means positioning a top end of the strip in the sealing means and cutting means that upon receipt of a command cuts from the top end a segment of strip of predefined length.

7. Station according to claim 1, further comprising means for feeding the segments as a continual strip, the feeding means positioning a top end of the strip in the sealing means and cutting means that upon receipt of a command cuts from the top end a segment of strip of predefined length and the cutting means is commanded by a movement of the mobile sealing surface that is nearest to the segment to be sealed.

8. Station according to claim 6, wherein the feeding means includes motorized pincers to translate backwards and forwards in the feeding direction of the strip in the sealing means, the pincers are commanded to grip the strip when the pincers are in a position away from the sealing means, to push the strip between the sealing means during a forward movement towards the sealing means and release the strip for a free return towards a far position.

9. Station according to claim 8, wherein in a position near the sealing means a pair of fixed pincers is present to grip the strip to keep the strip firm during actuating of the cutting means.

10. Station according to claim 6, wherein the strip feeding path of the strip of segments is transversal to the film flowing path.

* * * * *